United States Patent

Kuchar

[11] Patent Number: 5,984,777
[45] Date of Patent: Nov. 16, 1999

[54] REMOTE COMBINE SIEVE ADJUSTER

[76] Inventor: George J. Kuchar, P.O. Box 696, Carlinville, Ill. 62626

[21] Appl. No.: 09/022,997

[22] Filed: Feb. 12, 1998

[51] Int. Cl.$^6$ ...................................................... A01F 12/32
[52] U.S. Cl. ............................ 460/101; 460/72; 460/109; 460/5
[58] Field of Search ...................................... 460/101, 102, 460/72, 109, 119, 120, 5

[56] References Cited

U.S. PATENT DOCUMENTS

| | | | |
|---|---|---|---|
| 4,897,072 | 1/1990 | Bestland | 460/101 X |
| 5,338,257 | 8/1994 | Underwood | 460/8 |

FOREIGN PATENT DOCUMENTS

| | | | |
|---|---|---|---|
| 5304821 | 11/1993 | Japan | 460/101 |
| 5304826 | 11/1993 | Japan | 460/101 |

Primary Examiner—Thomas B. Will
Assistant Examiner—Arpad Fabian Kovacs
Attorney, Agent, or Firm—Richard C. Conover

[57] ABSTRACT

The present invention has a wrist connector connected to a conventional slat connection member. An electrically activated liner actuator which includes a linearly movable shaft is connected to the wrist connector to move the slat connection member fore or aft. The actuator is electrically controlled from an electrical control box located in the cab. Further, the actuator provides an electrical signal output responsive to the linear position of the shaft. This output signal is directed to the control box which has a meter driven by this output signal to provide a visual indication of how far the openings are opened or closed.

1 Claim, 2 Drawing Sheets

REMOTE COMBINE SIEVE ADJUSTER

BACKGROUND

Conventional combines have sieves that function to separate kernels of grain from chaff and other foreign objects. The sieve is constructed of spaced apart slats mounted in parallel relation. A pivot bracket is mounted at one end of each slat. The pivot brackets are connected together with a slat connection member such as shown in U.S. Pat. No. 4,712,568, to Strong et al. As the slat connection member is moved fore and aft the slats are rotated in a manner similar to the operation of a Venetian blind. The rotation causes the openings in the sieve to open and close.

If the openings in the sieves are not adjusted properly, a combine will throw a considerable amount of grain away with the chaff. On older combines, the operator may not even be aware this is happening. Newer combines usually have a "grain loss monitor" in the exhaust path. But even when this instrument begins to show a loss trend, in most instances the operator still has to get out of the cab, walk to the rear of the combine, and then manually adjust the openings in the sieves. Sometimes he has to perform this operation several times as he "homes in" on the correct opening in the sieves for the grain conditions being encountered.

Several patents have addressed the problem of enabling a combine operator to adjust the sieve openings. For example, see U.S. Pat. No. 4,712,568, to Strong et al. This patent shows a handle for manipulating the sieve openings. U.S. Pat. No. 4,897,072 to Bestland shows a flexible pipe mechanically connected between a sieve and the cab of a combine so that an operator can turn a crank in the cab to mechanically adjust the opening of a single sieve. With this apparatus a single hand crank is associated with a single sieve and the apparatus provides no indication as to how far open or how far closed each sieve is adjusted when turning the crank.

From the above it can be seen that what is needed is a remote sieve adjusting apparatus which can easily control the sieve openings from a combine cab and further provide a visual indication as to how far the sieve openings are opened or closed.

SUMMARY OF INVENTION

The present invention has a wrist connector connected to a conventional slat connection member. An electrically activated liner actuator which includes a linearly movable shaft is connected to the wrist connector to move the slat connection member fore or aft. The actuator is electrically controlled from an electrical control box located in the cab. Further, the actuator provides an electrical signal output responsive to the linear position of the shaft. This output signal is directed to the control box which has a meter driven by this output signal to provide a visual indication of how far the openings are opened or closed.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 3 is an enlarged detail view of a wrist connector connected to a slat connection member as shown in FIG. 1.

DESCRIPTION OF A PREFERRED EMBODIMENT

Figure 1:
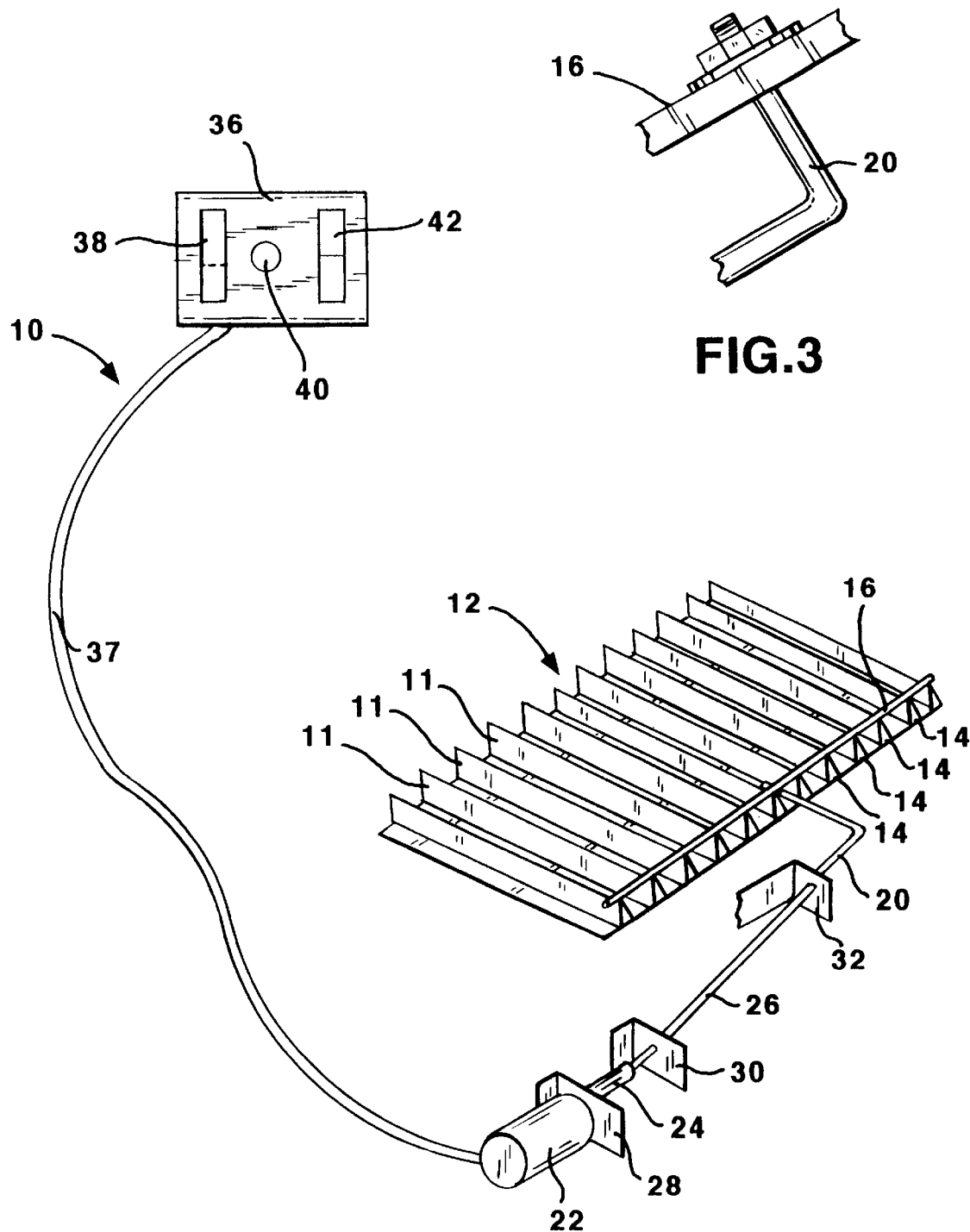
FIG. 1 is a schematic drawing of a remote combine sieve adjuster according to the present invention.

A remote combine sieve adjuster 10 is shown in FIG. 1 with respect to only one sieve 12. It is understood that sieve adjuster 10 could be duplicated for each bank of sieves in a stack.

Sieve slats 11 are pivoted together to open or close the sieve 12 in a manner somewhat similar to the operation of a Venetian blind. Each slat 11 has a pivot bracket 14 mounted to an end of the slat. The pivot brackets 14 are connected together with a slat connection member 16, so that as slat connection member 16 is moved longitudinally fore and aft, the pivot brackets are pivoted at the same time to open or close the slates 11.

The present invention includes a wrist connector 20 which is connected to the slat connection member 16 so that a push or pull on a wrist connector 20 will move slat connection member 16 either fore or aft. In a preferred embodiment the wrist connector 20 includes a shaft extending through a hole in connection member 16 and is rotationally secured therein as shown in FIG. 3. The wrist connector 20 is pushed or pulled by a bi-directional linear actuator 22 which in a preferred embodiment is a Model 160ADDCO actuator. Actuator 22, in response to an electrical signal input, either extends or retracts shaft 24 relative to the body. A push pull cable 26 is threadably connected at one end to shaft 24, and at the other end threadably connected to wrist connector 20.

The body of linear actuator 22 is held in place on a combine by a mounting bracket 28 that is attached to the body of the linear actuator and also the combine. A second mounting bracket 30 is attached to the combine and slidably receives push pull cable 26 through a bore in the bracket. A third mounting bracket 32, attached to the combine, slidably receives wrist connector 20 through a bore in the bracket. An electrical cable 37 is led from the body of linear actuator 22 to the cab of the combine.

A control box 36 is positioned inside the cab of the combine and is electrically connected to actuator 22 through cable 37 as shown in FIG. 1.

Control box 36 has a display meter 38 mounted in a face for indicating the amount of sieve opening of sieve 12. Switch 40 is an on-off switch for energizing the control circuit 36 shown in FIG. 2.

Adjusting switch 42 is installed in control box 36 as shown in FIG. 1. Switch 42 is a toggle switch which is used to control actuator 22.

Figure 2:
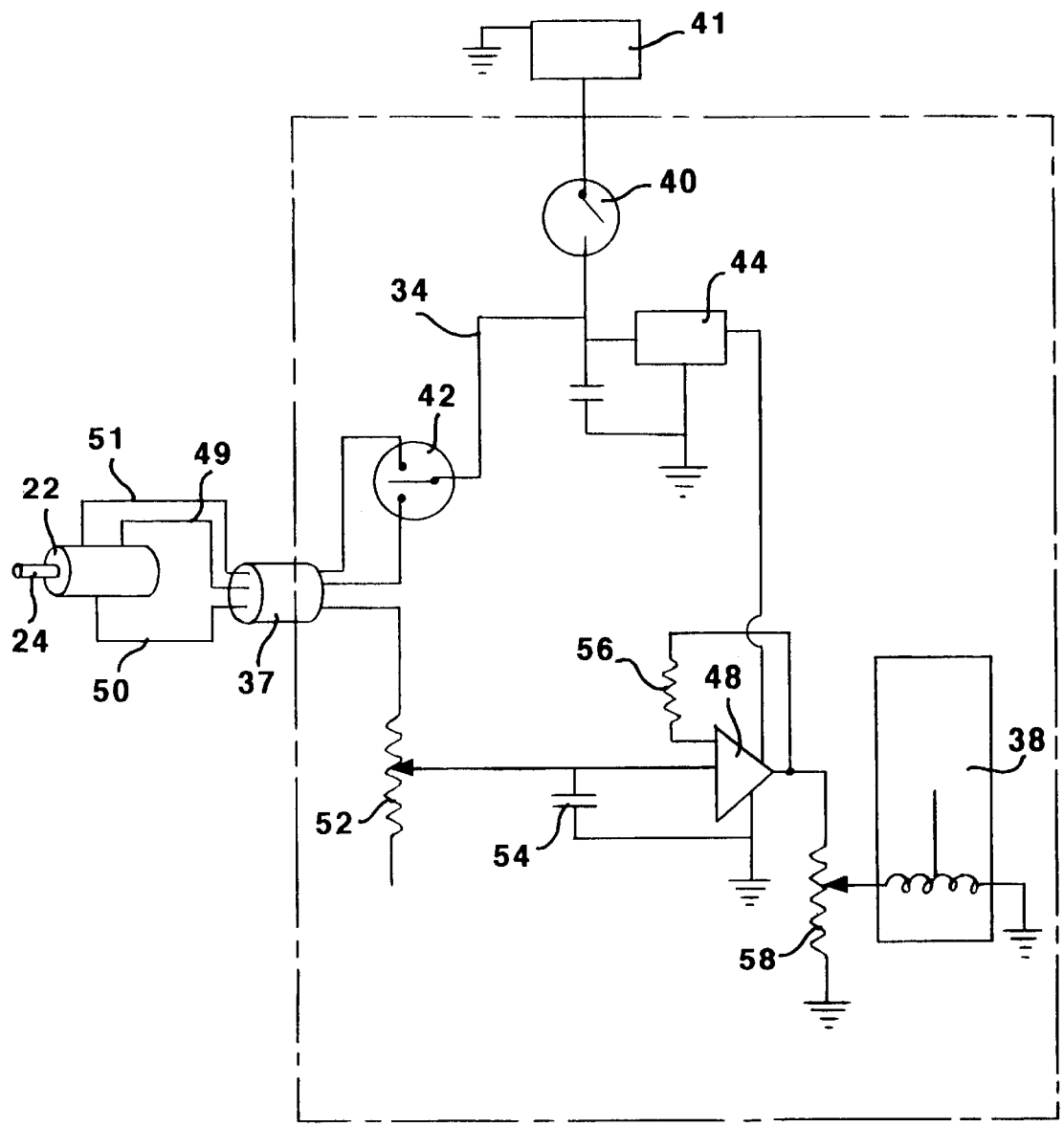
FIG. 2 is a schematic of an electrical circuit used with the remote combine sieve adjuster shown in FIG. 1.

The control circuit 36 is shown in FIG. 2. When selector switch 40 is turned on, direct current (DC) power from power supply 41 is electrically connected to voltage regulator 44. A capacitor 46 ground transients on the input side of voltage regulator 44. From voltage regulator 44, regulated DC power is then led to operational amplifier 48 to power the amplifier circuit.

Actuator 22 is connected through toggle switch 42 to the power supply 41. Switch 42 is a double pole, single throw, short-interval-closing switch which has the DC power from power supply 41 connected to the throw terminal through lead 34. As the throw of this switch closes in one direction or the other, it directs a short pulse of power (which lasts for the short-interval-closing time of the switch) to actuator 22 through leads 49 or 51 located in cable 37. The short pulse of power directed at linear actuator 22 either extends or retracts shaft 24 relative to the housing of the linear actuator 22 depending upon which direction the throw is thrown.

An internal potentiometer in linear actuator 22 provides an electrical signal responsive to the position of shaft 24 which signal is directed through lead 50 to control box 36. The strength of the electrical signal can be adjusted using resistor 52. Any transients on the line will be bled off to ground using capacitor 54. With this arrangement, the electrical signal signifying shaft 24 position is led as one of the inputs to operational amplifier 48.

A feedback circuit is used to stabilize amplifier 48. A signal from the output of amplifier 48 is led back through resister 56 then fed back into another of the inputs to the amplifier 48. This establishes the feedback circuit.

The output of amplifier 48 is also led through a variable adjusting resister 58 to the meter 38. Variable resister 58 can be used to "zero" meter 38 whenever the actuator shaft 24 is in its neutral, centered, position. As actuator shaft 24 varies from this neutral position, meter 38 will indicate the amount of variation from neutral. It can be appreciated that analog meter 38 can be easily replaced with a digital meter using techniques that are well known in the art.

Leads 49, 50, and 51 are bundled together in cable 37 as shown in FIG. 2.

In operation, an operator turns switch 40 on to energize the electrical circuit 36. Adjusting switches 42 are then used to open sieve 12 by pushing on the top of adjusting switch 42, or closed by pushing on the bottom of adjusting switch 42. Since adjusting switch 42 is a short-interval-closing switch, the operator slowly toggles the sieves to the desired opening. As the operator makes these adjustments, he can see the effect of opening or closing sieve 12 by monitoring the reading shown with meter 38.

While the fundamental novel features of the invention have been shown and described, it should be understood that various substitutions, modifications and variations may be made by those skilled in the art without departing from the spirit or scope of the invention. Accordingly, all such modification or variations are included in the scope of the invention as defined by the following claims.

I claim:

1. A remote combine sieve adjuster for use with a combine having sieve slats opened or closed by pushing or pulling a slat connection member comprising:

a wrist connector pivotally mounted to the slat connection member;

an electrical bi-directional linear actuator receiving an electrical control signal and extending or retracting a shaft in response to the electrical control signal;

the shaft connected to the wrist connector for linearly moving the slat connection member to adjust an opening between adjacent sieve slats;

an adjusting switch, located in the cab of the combine, electrically connected to the actuator, the adjusting switch providing the electrical control signal for controlling the actuator;

the actuator providing an electrical signal output responsive to the linear shaft position of the actuator; and a meter located in the cab of the combine;

the meter responsive to the electrical signal output of the actuator for providing a visual indication of the opening between adjacent sieve slats.

\* \* \* \* \*